(12) United States Patent
Thakker

(10) Patent No.: US 9,202,222 B2
(45) Date of Patent: Dec. 1, 2015

(54) METHOD AND SYSTEM OF DISPATCHING NON-DIGITAL MERCHANDISE AND/OR ALLIED SERVICES RELATED CODE VIA A DEVICE OPERABLE ON A MOBILE COMMUNICATION NETWORK

(75) Inventor: Mitesh Thakker, Mumbai (IN)

(73) Assignee: Mitesh Thakker, Mumbai (IN)

( * ) Notice: Subject to any disclaimer, the term of this patent is extended or adjusted under 35 U.S.C. 154(b) by 1945 days.

(21) Appl. No.: 12/332,742

(22) Filed: Dec. 11, 2008

(65) Prior Publication Data

US 2009/0157485 A1    Jun. 18, 2009

Related U.S. Application Data

(60) Provisional application No. 61/013,403, filed on Dec. 13, 2007.

(51) Int. Cl.
  *G06Q 30/00* (2012.01)
  *G06Q 30/02* (2012.01)
  *G06Q 10/06* (2012.01)

(52) U.S. Cl.
  CPC .......... *G06Q 30/02* (2013.01); *G06Q 10/06311* (2013.01); *G06Q 30/0212* (2013.01); *G06Q 30/0261* (2013.01)

(58) Field of Classification Search
  None
  See application file for complete search history.

(56) References Cited

U.S. PATENT DOCUMENTS

| | | | |
|---|---|---|---|
| 6,658,389 B1 | 12/2003 | Alpdemir | |
| 7,027,801 B1 | 4/2006 | Hall et al. | |
| 7,376,580 B1 * | 5/2008 | Walker et al. | 705/14.36 |
| 8,121,898 B2 * | 2/2012 | Altberg et al. | 705/14.73 |
| 8,818,842 B2 * | 8/2014 | Liu | 705/14.1 |
| 2004/0249723 A1 | 12/2004 | Mayer | |
| 2008/0177616 A1 * | 7/2008 | Nemirofsky et al. | 705/10 |
| 2008/0313039 A1 * | 12/2008 | Altberg et al. | 705/14 |
| 2010/0017280 A1 * | 1/2010 | Davis et al. | 705/14.4 |
| 2010/0057567 A1 * | 3/2010 | Desu Ramanjaneyulu | 705/14.54 |
| 2012/0022944 A1 * | 1/2012 | Volpi | 705/14.53 |
| 2012/0078702 A1 * | 3/2012 | Rissanen | 705/14.26 |
| 2013/0013420 A1 * | 1/2013 | Bamborough et al. | 705/14.69 |

* cited by examiner

*Primary Examiner* — Jamie Kucab
(74) *Attorney, Agent, or Firm* — Hamre, Schumann, Mueller & Larson, P.C.

(57) ABSTRACT

A method and system of dispatching a non-digital merchandise and/or allied services related code is described, via a device operable on a mobile communication network. The method involves providing a pre-defined code indicative of non-digital merchandise and/or allied services on a promotional medium, the promotional medium being viewable by a user. The predefined code is input via a device operable on a mobile communication network by the user. The pre-defined code is stored in a storage medium. The stored code is analyzed for determining consumer requirements, so as to extract requisite information from the storage medium. The information is extracted from storage medium according to the analyzed code. Extracted information is communicated to a consumer and a merchandise provider via a device operable on the mobile communication network. Transformation of the extracted information is performed simultaneously.

19 Claims, 11 Drawing Sheets

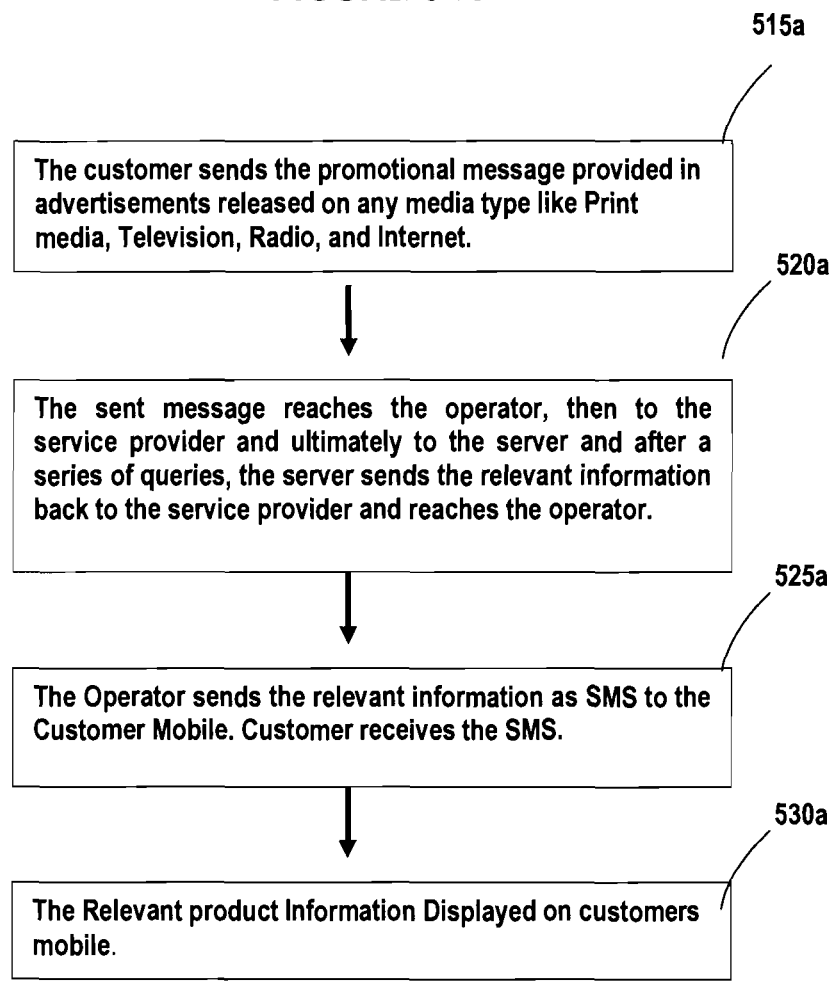
FIGURE 5-A

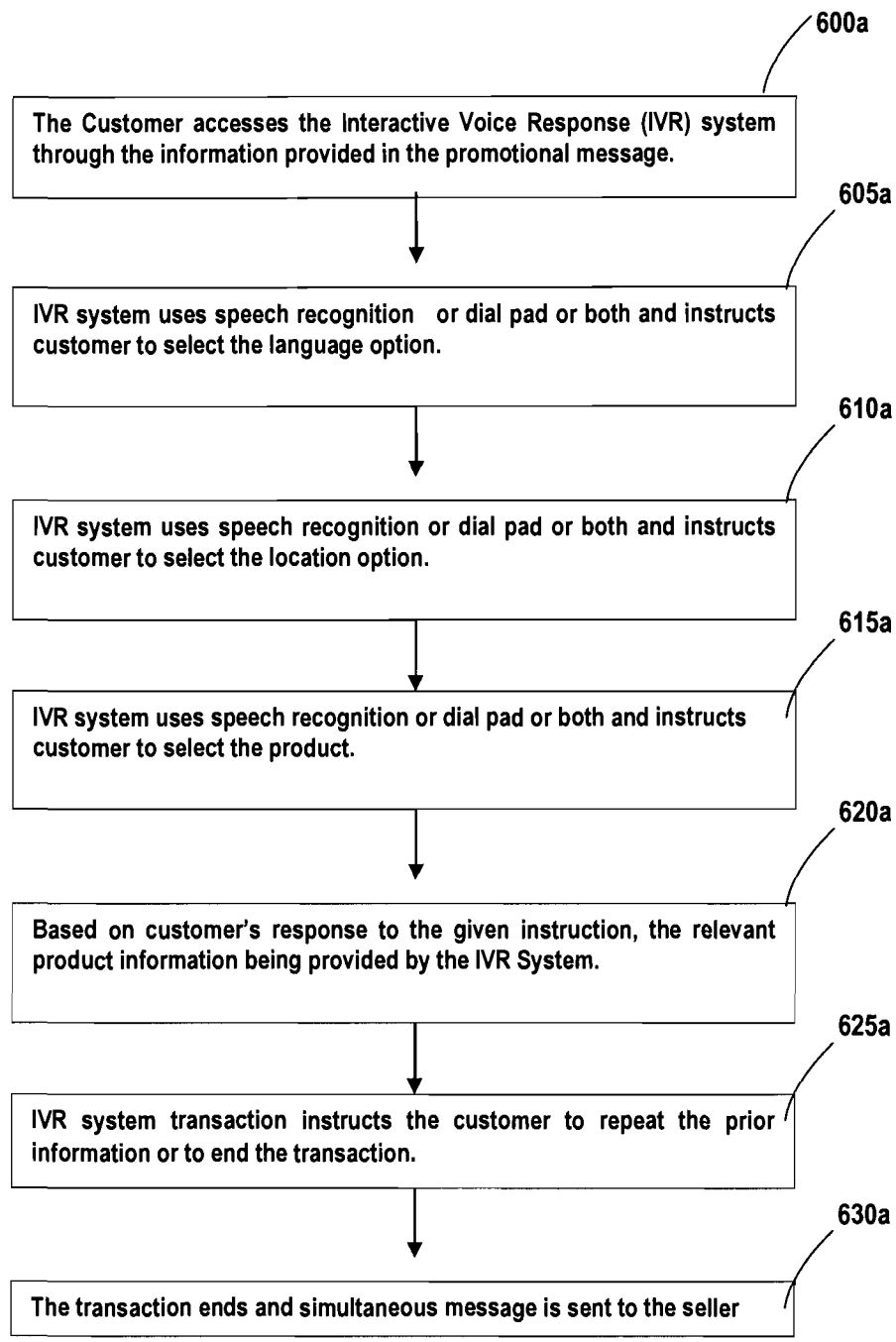
FIGURE 6-A

FIGURE 7-A
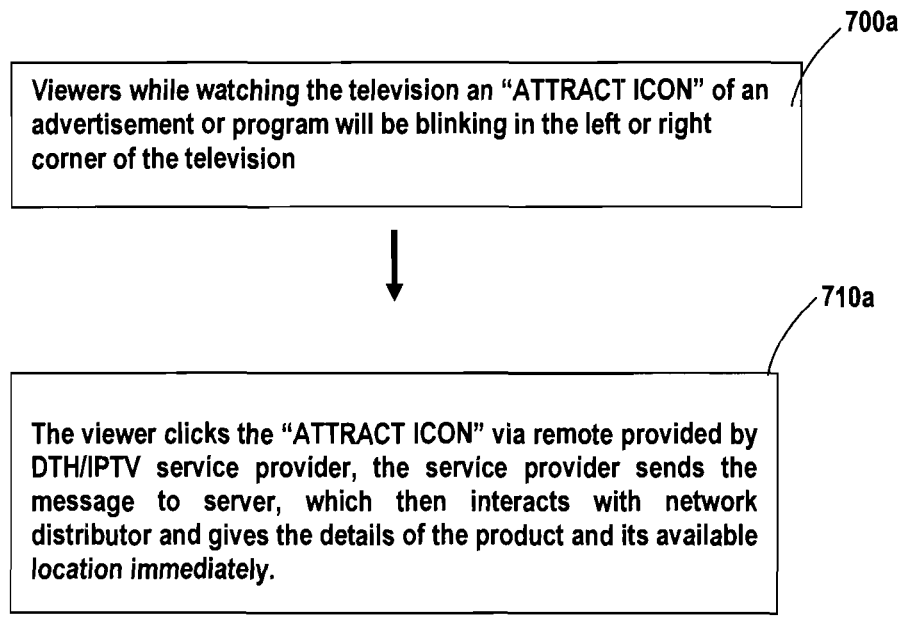

BUSINESS-TO-BUSINESS METHODOLOGY (B2B)

METHOD AND SYSTEM OF DISPATCHING NON-DIGITAL MERCHANDISE AND/OR ALLIED SERVICES RELATED CODE VIA A DEVICE OPERABLE ON A MOBILE COMMUNICATION NETWORK

This application claims the benefit of U.S. Provisional Application Ser. No. 61/013,403, filed on Dec. 13, 2007, the entire contents of which are incorporated herein by reference.

FIELD

This disclosure generally relates to conducting commercial activities via a mobile communication network.

In particular, this disclosure relates to a method and system of conducting commercial transactions by dispatching non-digital merchandise and/or allied services related code by a user via a device operable on a mobile communication network.

This disclosure described a location-based lead management platform, where in the leads are delivered and updated remotely over short message service or other desired channels. In addition to location tagging, the system also tags various parameters of media campaign and integrates with the last mile sales channel of the brand.

BACKGROUND

Prior to the advent of the industrial age, commercial transactions carried out by institutions were limited to a restricted territory and the user presence was invariably local.

However, with the advent of the industrial age, commercial transactions are carried out on a large scale. As a result, in the modern scenario, commercial transactions performed by institutions are governed by increasing competitiveness and stringent budget controls. As a result, the personnel conducting marketing transactions are subject to constant pressure to produce results and justify marketing expenditure. Therefore, financial terminologies, for example, Return On Investment (ROI) and Economic Value Added (EVA) are no longer terminology, that is the sole concern of finance personnel in an institution involved in commercial transactions.

As a result, the disbursing of product information and product related financial information assumes significance. In addition, the timeliness of disbursing of product information and product related financial information is crucial. In this context, the media employed for disbursing of information is important.

Further, as the media becomes increasingly fragmented and media options are dynamically multiplied, the requirement to simplify the decision-making process for a media managing personnel also increases.

Evaluating best advertising elements and identifying the optimum media are important but it is very difficult to generate an authentic decision in the absence of proper performance measuring tools.

Offline advertising methods like brochures, newsletters or billboards etc. are not only costlier than online media campaigns but there is no guarantee they would drive customers to your store/website or for that matter to purchase your products. You are unable to link which advertisement has evoked what kind of a response. Measuring offline advertising is one thing most marketers don't do due to lack of proper tools or technical resources.

In the present scenario, media planners are increasingly interested in deploying the optimum approach so that, expenditure of a large portion of their advertising budgets is avoided on ineffective conventional mediums. As a result, they are always in the quest for innovative and efficient new tools that can enrich the customer engagement and provide more promising methods to ensure that the advertisements are converting into the merchandise. Thus, planners in the modern scenario implement the response-driven approach to deliver effective communication at an optimum Return-On-Investment (ROI).

The conventional system of business is from advertisement that generates leads to the call center. Response to such leads by call center takes 3 to 8 days, and further the inquiries are forwarded to the sales department for manual distribution to local front liners or agents that play a key role in closing the leads. Further, the feedback mechanism on the status of the inquiries distributed takes another 6 to 14 days, and at times it is never received. In the above process, the Lead Generated loses its intensity as the response time to the customer in closing the lead has the longer cycle time and is transferred through several entities.

The conventional system does not eliminate the delay in response to the user, as opposed to the present described system and method. In the described system and method, the leads generated by advertisement pass through a rapid real time processing, and various parameters ensure that the leads are in the right hands that have capability to close the lead in the shorter time span, which, in turn enhances the brand equity and causes both the agent and customer to be consistent.

In this present scenario, the advent of the Internet and the mobile communication network has substantially transformed the mode of commercial transactions performed by a consumer. Prior to the advent of the Internet and the mobile communication networks, the mode of the commercial transaction performed by a consumer, involved the consumer being physically present at the venue of the transaction or at least in the proximity of a stationary communication device. Conducting a commercial transaction while being on the move had not been envisaged in such a scenario. For example, in the prior scenarios, when a consumer views an advertisement in the media for example in media type like, print media such as newspapers, magazines, journals, posters, billboards, wall paintings, broadcast media such as, Television, out of home Media (OOH), Radio, mobile television and web media like Internet, etc. and has the intention of purchasing the non-digital merchandise, conventionally, the procedure adopted is that, on viewing the advertisement, the consumer finds out the information regarding the names of the merchandise providers of the non-digital merchandise, allied services and their respective contact details.

The consumer then verifies the names and corresponding contact details of the merchandise providers and contacts them individually to find out the optimal price and availability of the non-digital merchandise and/or allied services. The process is cumbersome. With the advent of the Internet and the mobile communication network, although it is possible for the consumer to contact the merchandise providers on the move, it is still a repetitive process for the consumer to determine the optimal price from among a set of merchandise providers. There is therefore, a need for a process of obtaining the optimal price in a more convenient manner.

For consumers on the move, it is very convenient if the non-digital merchandise and/or allied service of their choice is delivered at the present geographical location of the consumer or a geographical location of their choice.

In U.S. Pat. No. 7,027,801, a proposal in the art reveals a method and system for delivering location-based targeted advertisements to mobile subscribers. The proposal reveals a system, which has the capability for pushing advertisements that relate to a specific consumer profile or pushing information that relates to a consumer profile according to a very specific consumer information location. More specifically, a consumer initially logs in to a consumer server and enters profile information. Similarly, a vendor also enters its' vendor information through the same, or a different server. Finally, the user enters device capability information into a database wherein the combination of vendor information, consumer profile information and device capability information are all used in conjunction with an application server and a location server to determine what data, information or advertisements are to be pushed to the information consumer.

Yet another proposal in the art, disclosed in U.S. Pat. No. 6,658,389, reveals a system, method, and business model for speech-interactive information system having business self-promotion, audio coupon and rating features. The proposal reveals a system comprising: a speech server receiving a spoken voice telephone call from an external telephone including spoken voice input commands requesting information on a good or service from an end user without requiring said end user to provide any text or symbolic command representation; a speech-to-text conversion engine converting said received spoken voice input commands from said external telephone separate from said speech-to-text conversion engine over a wired or wireless telephone line to generate output text-based or symbol-based commands and data; means for determining a geographic location of interest of an end user making said spoken telephone call; a database storing a plurality of data items including a merchant identity information and at least one good or service associated with said merchant.

A further proposal in the art, disclosed in U.S. Published Patent Application No. 20040249723, reveals a system and method for the automatic selection of a good buy in price-comparison sites, when the user buys more than one merchandise at the same time. However, the references in the art reveal methods and systems of a user on the move enabled to receive advertisements, enabled to obtain information about merchandises in the convenient geographical location and user having a good buy in comparison when the user buys more than one merchandises. The reference discloses an inventive system and method for automatic selection of a good buy in price-comparison sites when the user buys more than one merchandise at the same time by allowing users to search for one or more acceptable or near-optimal item combinations when buying multiple items from multiple vendors at the same time, instead of trying to find an optimal combination, preferably by using efficient and practical heuristics, and preferably with automatically offering additional complementary services when required.

The references in the art do not reveal a system, which brings the benefits of the online media to the conventional media in order to make the marketers equipped with the authentic performance measuring tools to increase the effectiveness of their marketing efforts.

However, the references in the art do not reveal a system in which the leads generated by the advertisement campaigns appear on the cell phones of front-lines/agent within few seconds of its occurrence.

The references in the art do not reveal a system in which leads are distributed directly to the efficient most front-liners/agents nearest to user on their mobile and the same lead and its status are reported to personnel concerned.

However, the references in the art do not reveal the entire process starting with a predefined code being sent to the service provider and ending in a sale in a short duration, the entire process being executed through mobile communication network, if the user agrees with the optimal price or a price subject to predefined market conditions and availability of the non-digital merchandise supplied by the merchandise provider, and received by the user on the move as part of the information received from the service provider.

The references in the art do not reveal market intelligence information of any non-digital merchandise and/or allied services capable of being judged, based on the output of the code received from the user on the move.

The references in the art do not reveal a campaign performance report capable of being generated based on the output of the code received from the user on the move.

The references in the art do not reveal a conversion tracking of the number of enquiries from the user in the form of a code, which have been converted into the actual purchase of the non-digital merchandise and/or allied services.

The references in the art do not reveal a merchandise provider performance report capable of being generated, based on the output of the code received from the user on the move. Further, references in the art do not reveal a real-time monitoring and mechanism for the control of the stocks of the non-digital merchandise allotted to the merchandise provider from the merchandise manufacturer and any allied services thereof, based on the feedback of the real-time monitoring of the merchandise provider.

The references in the art do not reveal a geographical location performance report for specific non-digital merchandise and any allied services, based on the output of the code received from the user on the move.

The references in the art do not reveal a network performance report in which the network adopted for making the purchase for example, an internet website, an input via a code to be sent via short message service.

The references in the art do not reveal a media performance report capable of being generated, based on the output of the code received from the user on the move.

The references in the art do not reveal an advertisement performance report capable of being generated, based on the output of the code received from the user on the move.

The references in the art do not reveal a unified report which can be generated by using data as contained in the outputs and embodied in one or combination of the reports and may be combined completely or in parts as appropriate to the requirement, based on the output of the code received from the user on the move.

The references in the art do not reveal a system which performs factual comparisons across media and provides intelligence to the media managers that can result into performance-oriented advertisement expenditure, which leads to targeted brand awareness and business as desired in a non-cumbersome manner.

The references in the art do not reveal a system, which helps to decide media advertisement, news paper, television channel, radio and creative advertisement copy is beneficial in a given territory in a non-cumbersome manner.

The references in the art do not reveal a system, which further refines the analytics by measuring the conversions from awareness and desire for each advertisement campaign which in turn creates an opening as to make the advertisement campaigns more effective and thus making them achieve more from the existing advertisement budget in a non-cumbersome manner.

The references in the art do not reveal a system, which enables the performance of advertising in a scientific and manner in which performance of advertising is not random, but it also has the capability of quantifying the results of the advertisement in a non-cumbersome manner.

The references in the art do not enable prediction of the response rates of advertisements.

Marketing campaign effectiveness has been one of the most challenging processes to quantify for any marketer or company. Most of the time is spent in gathering and collating response data, thus losing focus on the campaign design and execution. With ever increasing media opportunities, keeping track of several campaigns and handling voluminous data related to campaigns is a difficult task. The references in the art do not enable advertising to be less wasteful and more measurable.

The references in the art do not enable measuring marketing performance in a non-cumbersome manner.

SUMMARY

A system and method are described of an entire process initiated with a non-digital merchandise and/or allied services related code being sent to a service provider by a user on a move and ending in a sale in a short duration, the entire process being executed through a mobile communication network, if the user is in consent with an optimal price or a price subject to predefined market conditions and availability of the non-digital merchandise, merchandise range, merchandise category, merchandise class supplied by the merchandise provider and received by a user on a move as part of the information received from the service provider.

The non-digital merchandise and/or allied services related code may contain pre-defined symbols which are essentially numeric or alphanumeric codes with or without special characters that describe products, brands, etc., which is used to enquire about their availability, price or other specifications.

In addition, a system and method are described in which market intelligence of any non-digital merchandise and/or allied services is capable of being judged, based on the output of the non-digital merchandise and/or allied services related code received from the user on the move.

In addition, a system and method are described of providing a campaign performance report capable of being generated, based on an output of a non-digital merchandise and/or allied services related code received from the user on the move.

In addition, a system and method are described of providing conversion tracking of number of enquiries from an user in the form of a code, which has been converted, into an actual purchase of a non-digital merchandise and/or allied services.

In addition, a system and method are described of providing merchandise provider performance report capable of being generated based on the output of the non-digital merchandise and/or allied services related code received from the user on the move. Further, another objective of the system and method is a real-time monitoring system and mechanism for the control of the stocks of the non-digital merchandise allotted to the merchandise provider by the merchandise manufacturer, based on the feedback of the real-time monitoring of the merchandise provider.

In addition, a system and method are described of providing a geographical location performance report for specific non-digital merchandise and/or allied services, based on the output of the code received from the user on the move.

In addition, a system and method are described of providing a network performance report in which the network adopted for making the purchase for example, an Internet website, a non-digital merchandise and/or allied services related code to be sent via short message service.

In addition, a system and method are described of providing a media performance report capable of being generated based on the output of the code received from the user on the move.

In addition, a system and method are described of providing an advertisement performance report capable of being generated, based on the output of the code received from the user on the move.

In addition, a system and method are described in which the data as contained in the outputs and embodied in one or combination of the reports may be combined completely or in parts as appropriate to the requirement to generate a unified report, based on the output of the code received from the user on the move.

In addition, a system is described which performs factual comparisons across media and provides intelligence to the media managers that can result into performance-oriented advertisement expenditure, which leads to targeted brand awareness and business as desired.

A system is also described which helps to decide media, advertisement, newspaper, television channel, radio and creative advertisement copy, is beneficial in a given territory.

Further, a system is described which further refines the analytics by measuring the conversions from awareness and desire for each advertisement campaign which in turn creates an opening as to make the advertisement campaigns more effective and thus enabling to achieve more from the existing advertisement budget.

A system is provided to measure the revenue corresponding to the expenditure and also the prospective revenues.

In one embodiment, a system and method are provided of conducting commercial activities by dispatching non-digital merchandise and/or allied services related code by a user via a mobile communication network. The code indicative of non-digital merchandise and/or allied services is viewable on a promotional medium. The code can be used by the user on the move, to determine the names and contact details of the merchandise providers of a required non-digital merchandise, merchandise range, merchandise category, merchandise class, identify the optimal price or a price subject to predefined market conditions and availability of the non-digital merchandise in a required geographical area, perform a purchase decision and enable the information pertaining to non-digital merchandise to be delivered, the entire operation being completed in a short span of time, if the user is in consent with the price of the non-digital merchandise supplied by the merchandise provider and received by the user on the move, as part of the information received from the service provider.

Further, a method and system are described in which market intelligence of any non-digital merchandise and/or allied services is capable of being judged, based on the output of the predefined code received from the user on the move.

Furthermore, a system and method are described of providing a campaign performance report capable of being generated, based on the output of the predefined code received from the user on the move.

Still further, a system and method are described of providing conversion tracking of the number of enquiries from the user in the form of a predefined code, which has been converted, into the actual purchase of merchandise.

Still further, the method and system automatically filters the response by providing tags.

In an embodiment the tag may indicate the media associated with the response. In another embodiment the tag may represent location, the identity of the sales executive. In other embodiments the tag may represent any other factors associated with the response.

Still further, a system and method are described of providing a merchandise provider performance report capable of being generated, based on the output of the predefined code received from the consumer on the move. Further, a real-time monitoring system and mechanism are provided for the control of the stocks of the non-digital merchandise allotted to the merchandise provider by the merchandise manufacturer, based on the feedback of the real-time monitoring of the merchandise provider.

Still further, a system and method are described of providing a geographical location performance report for a specific non-digital merchandise and/or allied services, based on the output of the predefined code received from the user on the move.

Still further, a system and method are described of providing a network performance report in which the network adopted for making the purchase, for example, an Internet website, a predefined code to be sent via short message service, is evaluated.

Still further, a system and method are described of providing a media performance report capable of being generated based on the output of the predefined code received from the user on the move.

Still further, a system and method are described of providing an advertisement performance report capable of being generated, based on the output of the predefined code received from the user on the move.

Still further, a system and method are described in which the data as contained in the outputs and embodied in one or combination of the reports may be combined completely or in parts as appropriate to the requirement to generate a unified report.

Still further, a system is described which performs factual comparisons across media and provides intelligence to the media managers that can result into performance-oriented advertisement expenditure, which leads to targeted brand awareness and business as desired.

Still further, a system is described which helps to decide media, advertisement, news paper, television channel, radio and creative advertisement copy is beneficial in a given territory.

Still further, a system is described which further refines the analytics by measuring the conversions from awareness and desire for each advertisement campaign which in turn creates an opening as to make the advertisement campaigns more effective and thus making them achieve more from the existing advertisement budget.

DRAWINGS

The claimed invention and the attendant advantages of its various combinations and variations thereof, will become apparent in conjunction with the following detailed description and accompanying drawings wherein:

FIG. 5A is a flow chart of the method for dispatching non-digital merchandise and/or allied services related code via a device operable on a mobile communication network, as embodied in one of the media depicted in FIG. 4.

FIG. 6A is a flowchart of the method for dispatching non-digital merchandise and/or allied services related code via a device operable on a mobile communication network, as embodied in one of the media depicted in FIG. 4.

FIG. 7A is an illustration of the flowchart of the method for dispatching non-digital merchandise and/or allied services related code via a device operable on a mobile communication network, as embodied in one of the media depicted in FIG. 4.

DETAILED DESCRIPTION

Figure 1:
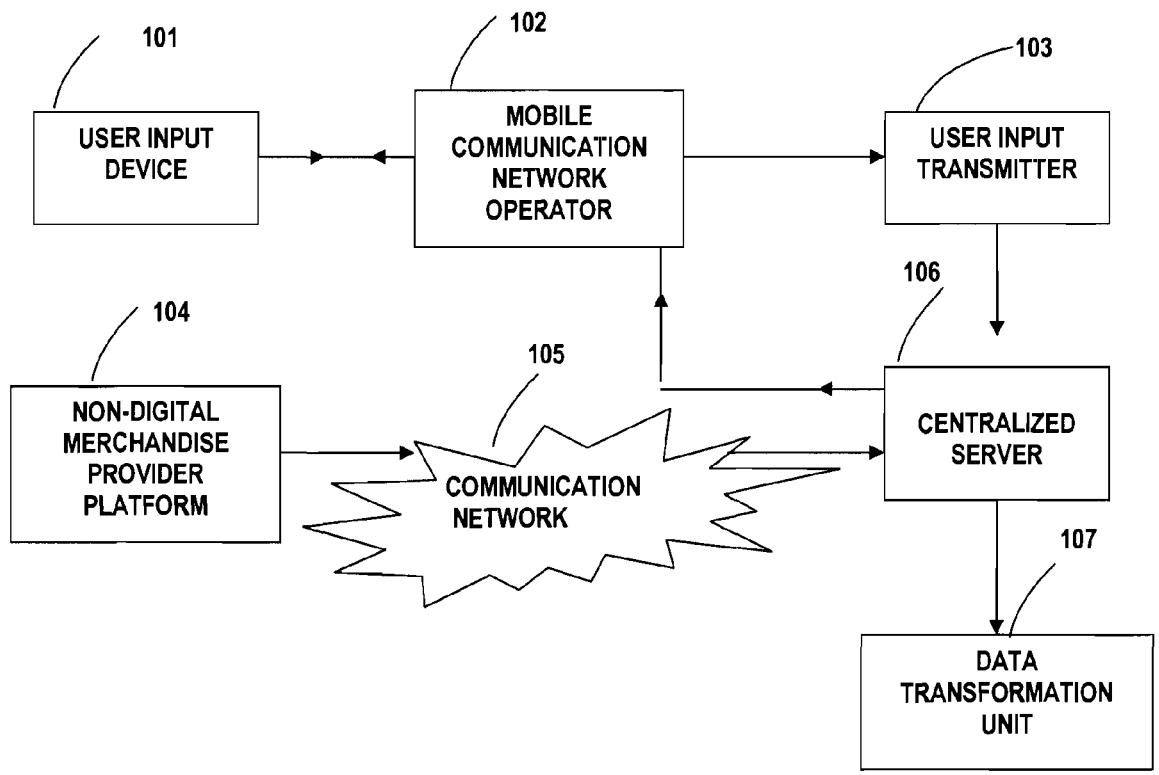
FIG. 1 is an illustration of the overview of a system of dispatching a non-digital merchandise and/or allied services related code via a device operable on a mobile communication network, in accordance with one embodiment.

This description describes a method and system of conducting commercial activities via a mobile communication network. In particular, this description is a method and system of conducting commercial activities by dispatching a non-digital merchandise and/or allied services related code by a user via the mobile communication network.

The description describes an On-Demand and On-Premise service, which can be distributed as a software application. In an embodiment it is available in an Enterprise Suite. In another embodiment it is available as a full version suite. In yet another embodiment it is available as a professional suite. In still another embodiment it is available in a Small Business Suite. The commercial arrangements may be prepaid and inclusive of, but not restricted to a variable licensing arrangement. A mode of commercial arrangement disclosed herein is merely illustrative and any functionally similar arrangement, combinations and variations thereof may be construed to be enclosed within the scope and spirit of the present disclosure.

The system and method can be implemented with an existing e-commerce application by employing a customized package.

The system and method can further be mounted on any type of interactive networks such as SMS (Short Message Service), IVR (Interactive voice response), WEB (WEBSITES), WAP (Wireless Application Protocol), DTH (Direct-To-Home), EMAIL (Electronic mail), USSD (Unstructured Supplementary Service Data) etc. and this enables ubiquitous response across networks from a customer who is located in a remote place.

The system and method are particularly suited for a scenario in which the user is on a move and is in possession of a mobile terminal operable on the mobile communication network. For a user on the move, the system and method provide a mode of making a purchase decision and also completing the purchase in a short span of time if the user is in consent with an optimal price or a price subject to predefined market conditions and availability of the non-digital merchandise and/or allied services, merchandise and allied services range, merchandise and allied services category, merchandise and allied services class supplied by a merchandise provider, and received by the user on the move, as part of the information received from a service provider.

The conventional mode of business is initiated from an advertisement that generates leads to a call center. Response to such leads by the call center takes 3 to 8 days, and further the inquiries are forwarded to a sales department for manual distribution to local front liners/agents who play a key role in closing the leads. Further, a feedback mechanism on a status of inquiries distributed takes another 6 to 14 days, and at times it is never received.

In the above process, the lead generated loses its intensity as the response time to the user in closing the lead has the longer cycle time and passes through several hands.

The system and method eliminates a delay in response to the user, as the leads generated by the advertisement pass through a rapid real time processing, that chooses the frontliner/agent, based on a geographic distance, and various parameters to ensure that the leads fall in the right hands that have the capability to close the lead in the shorter time duration, which in turn enhances a brand equity and enhances the inclination of both the agent and user to remain loyal to the brand. Still further the system and method also enables the real time distribution of goods or services at local level.

Although the system and method have been predominantly defined with respect to a non-digital merchandise and/or allied services, the term "non-digital merchandise and/or allied services" as employed in the present disclosure may encompass product and allied services which may include, but is not limited to a tangible merchandise and any allied services such as financial instrument(s), insurance policies or instrument(s), mutual fund instrument(s), tutorials, hotel, credit cards and mobile operators.

It is apparent to a person skilled in the art, that the examples stated herein, are illustrative and not exhaustive and the described system and method are not limited by its scope and spirit to the examples stated herein and may further pertain, to any product or service of similar nature that requires advertisement and trade network.

It is also apparent to a person skilled in the art that the described system and method may be employed in isolation for the usage of the allied services as a standalone application without the deployment of the product or the system and method may be deployed for the products in isolation without the usage of the allied services.

It is also apparent to a person skilled in the art that the described system and method encloses within its scope and spirit, any service similar in functionality to the functionality of the allied services as a standalone application without the existence of the product.

FIG. 1 is an illustration of the overview of the system of dispatching non-digital merchandise and/or allied services related code via a mobile communication network.

With reference to FIG. 1, the system of dispatching non-digital merchandise and/or allied services related code via a mobile communication network is operated in conjunction with a user input device 101, which is, in a preferred embodiment, a mobile terminal.

Even though the user input device 101 has been described as a mobile terminal, the terminology as included in the disclosure can functionally include, wireless mobile telephones, personal digital assistants (PDAs), personal communicators, and the like which is apparent to a person skilled in the art. The user or a consumer can input data in a variety of forms, including by a mobile phone keypad or various modes of data input possible as known in the art.

The system and method can further be mounted on any type of interactive networks such as SMS, IVR, WEB, WAP, DTH, EMAIL, USSD etc. this enables ubiquitous response across networks from a customer who is sitting in a remote place.

The system and method are particularly suited for a scenario in which the user or consumer is on a move and is in possession of the mobile terminal operable on the mobile communication network. For a consumer on the move, the system and method provides a mode of making a purchase decision and also completing the purchase in a short span of time, if the consumer is in consent with an optimal price or a price subject to predefined market conditions and availability of the non-digital merchandise and/or allied services supplied by a merchandise provider and received by the consumer on the move, as part of the information received from a service provider.

The consumer is required to input a pre-defined code in the user input device 101. The code is explained in detail in conjunction with FIG. 2.

The data input by the user is fed to a mobile communication network operator 102.

The mobile communication network operator 102 transmits the input of the user to a user input transmitter 103. In one embodiment, the mobile communication network operator 102 may be in the form of a single entity with the user input transmitter 103.

The output of the user input transmitter 103 is input to a storage medium exemplified as a centralized server 106. In a preferred embodiment the centralized server 106 is a single entity. As is apparent to a person skilled in the art, the storage medium exemplified as a centralized server 106 can be multiple entities at a single location or multiple entities that operate as a network. The server 106 comprises a database in which the details pertaining to the merchandise providers are stored.

In order to enable the details of the non-digital merchandise providers forming part of a platform 104 to be stored in the database, the non-digital merchandise providers are required to provide identifying information pertaining to their commercial transactions. As is prevalent in the art, the details may include a name and a location of the non-digital merchandise providers. The details stored in the server 106 are explained further in conjunction with FIG. 3. The non-digital merchandise providers are registered in the server 106 via a communication network 105. In a preferred embodiment, the communication network 105 includes Internet. Even though the communication network 105 includes the Internet in the preferred embodiment, it is apparent to a person skilled in the art that any network with similar functionality can be utilized.

The code sent by the consumer on the move, is stored in the server 106 and correlated with data stored beforehand. The correlation may be performed by a software algorithm or by any means known in the art for a similar functionality. The output of the correlation is fed to the user input device 101 through the mobile communication network operator 102.

Concurrently, an output of the correlation is stored in a data transformation unit 107. It would be apparent to a person skilled in the art that the data transformation unit 107 could be a unit residing within the server 106. Alternatively, the data transformation unit 107 may also be separate from the server 106 and exist as a stand-alone entity. The data transformation unit 107 is deployed so that the correlation output can be utilized for generating an analytical report.

The data transformation unit 107 can further be utilized for a real-time monitoring and providing a mechanism for the control of the stocks of the non-digital merchandise allotted to the merchandise provider by the merchandise manufacturer, based on the feedback of the real-time monitoring of the merchandise provider.

In an embodiment, the analytical report can be inclusive of a campaign performance report, campaign effectiveness report, conversion tracking report, dealer performance report, geographical location performance report, network performance report, media performance report and advertisement performance report.

In another embodiment, the reports may be one or a combination of the following types:
1) Advertisement agency performance/trend report
2) Media performance/trend report
3) Communication performance/trend report
4) Product or a Group of products performance/trend report
5) Keyword performance/trend report
6) Brand performance/trend report
7) Region performance/trend report
8) Campaign performance/trend report
9) Offer performance/trend report
10) Staff performance/trend report
11) Dealer/Supplier/Provider performance/trend report
12) Network performance/trend report
13) Market vacuum report
14) Transaction cycle report (tracking lead to conversion)
15) Region wise demand report for product/service
16) Delivery Route wise demand report for product/service The report/s can be presented in various forms like a Pie chart, Bar chart, Line chart, Area chart, Funnel chart, Speedometer chart, Doughnut chart, grid etc.

Figure 2:
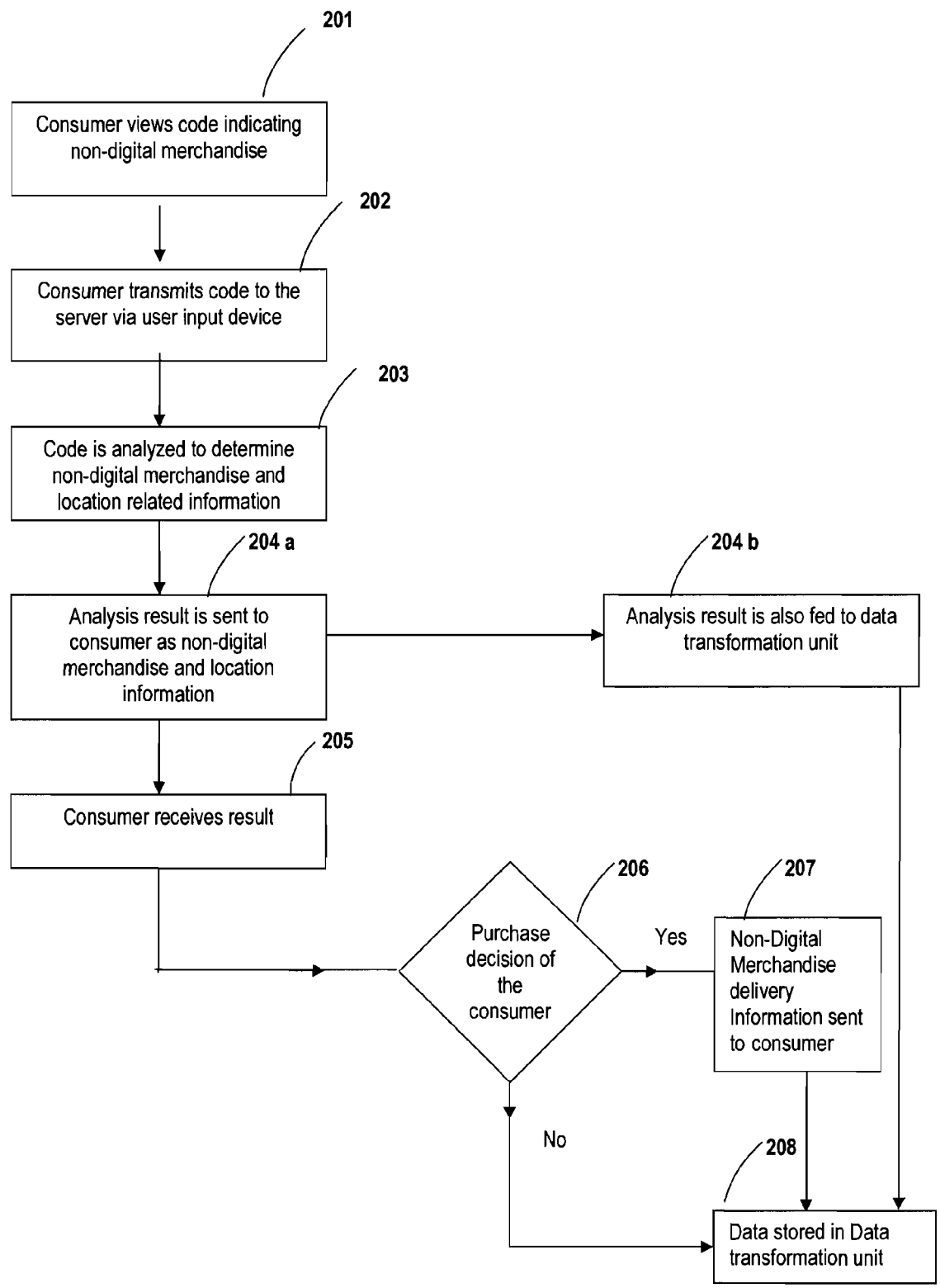
FIG. 2 is an illustration of a flowchart of a method of dispatching a non-digital merchandise and/or allied services related code via a device operable on a mobile communication network, in accordance with an embodiment.

FIG. 2 is an illustration of the flowchart of the method of dispatching the non-digital merchandise and/or allied services related code via a mobile communication network, in accordance with an embodiment.

With reference to FIG. 2, a method of dispatching a non-digital merchandise related code, via a device operable on a mobile communication network is disclosed. The method comprises the following steps:
(a) providing a pre-defined code indicative of a non-digital merchandise and/or allied services as part of a message on a promotional medium like Internet, mobile network, Print media, Television and being viewable by a user.
(b) accepting the said predefined code input via a device operable on the mobile communication network from the user;
(c) storing the predefined code in a storage medium;
(d) analysing the code for determining consumer requirements, so as to extract requisite information from the storage medium;
(e) extracting information from the storage medium according to the analysed code;
(f) communicating extracted information to the consumer via the device operable on the mobile communication network;
(g) performing transformation of the extracted information simultaneously.

In a preferred embodiment at step 201, the user views an advertisement with the pre-defined code indicating the non-digital merchandise and/or allied services. In alternative embodiments the code could indicate a merchandise range, merchandise category, or merchandise class. In a preferred embodiment, the code is essentially alphanumeric in nature. Persons skilled in the art will appreciate that the predefined code may be embodied in alternate and equivalent forms, which have similar functionality and not essentially restricted to being alphanumeric in nature. It would be apparent to a person skilled in the art, that the code may take the form of any varying indicia while still performing similar functionality. Any such variation may be seen as being within the scope of the present disclosure.

In a preferred embodiment, the code may include indicia, which indicate details pertaining to non-digital merchandise and/or allied services, merchandise range, merchandise category, merchandise class details, details pertaining to geographical location and details pertaining to media in which the advertisement is viewed. For example, the indicia for media may include details pertaining to the newspaper in which the code is viewed. Alternatively, the indicia for media may indicate the television channel in which the code is viewed.

In yet another embodiment, it may also indicate any other media that is applicable in the context of deployment of the novel aspects of the described system and method.

At step 202, the user transmits the predefined code as explained in conjunction with FIG. 1 to the centralized server via the user input device.

The predefined code is analyzed to determine the requirement of the user on the move at step 203. Based on an analysis result, the data pertaining to the required non-digital merchandise is extracted from the database stored on the centralized server.

At step 204a, the extracted information is sent to the user as the non-digital merchandise and the location related information. In one embodiment, the information may contain the optimal price or price subject to pre-defined market conditions of the non-digital merchandise and/or allied services. In another embodiment, the information may contain a list of details pertaining to merchandise and/or allied services. In yet another embodiment the information may contain a non-digital merchandise range. In a still further embodiment, the information may indicate a broader category of non-digital merchandise and/or allied services related information.

At a parallel step 204b, as the analysis result is sent to the user as merchandise and location information, it is also stored in the data transformation unit at step 208.

At step 205, the user receives the result. On the basis of the result, the user may be in consent with the purchase information and may decide at step 206 to make the purchase decision. In an embodiment the consent of the user could be decided via an SMS questionnaire. In another embodiments the consent of the user is decided via known modes. On obtaining the consent of the user and obtaining the required details, the merchandise provider is contacted and the information pertaining to the non-digital merchandise delivery and/or allied service is conveyed to the user. The mode of user input is via SMS and any mode of similar functionality.

In addition to conveying the non-digital merchandise delivery information at step 207 to the user, the user related data is also transmitted to the data transformation unit and stored in the data transformation unit at step 208.

If the user decides not to purchase the merchandise at step 206, the data is still transmitted and stored by consumer or an associated entity in the data transformation unit at step 208. As explained in FIG. 1, the data transformation unit is deployed so that the non-digital merchandise and/or allied services details can be utilized for generating an analytical report.

The analytical report can be inclusive of a campaign performance report, campaign effectiveness report, conversion tracking report, dealer performance report, geographical location performance report, network performance report, media performance based report and advertisement performance based report.

In alternative embodiments, the data as contained in the outputs and embodied in one or combination of the reports may be further combined completely or in parts as appropriate to the requirement to generate a unified report. In an embodiment, the data as contained in the output of the dealer performance report and geographical location performance report may be combined completely or in parts as appropriate to the requirement to generate a unified report.

The unified report may include locations in which non-digital merchandise and/or allied service providers are in existence without the indication of enquiries or proportionate number of corresponding enquiries.

In addition, the report may also include locations in which the number of existing non-digital merchandise and/or allied service providers is nil or not proportionate to the corresponding number of enquiries. The report is termed as "market vacuum" report or "market density report".

The example of "market vacuum" report or "market density report" is enclosed in the disclosure for the purposes of illustration only and all other usages of the output of the reports in combination such that the combination is complete or is in parts can be considered to be within the scope of the described system and method.

Figure 3:
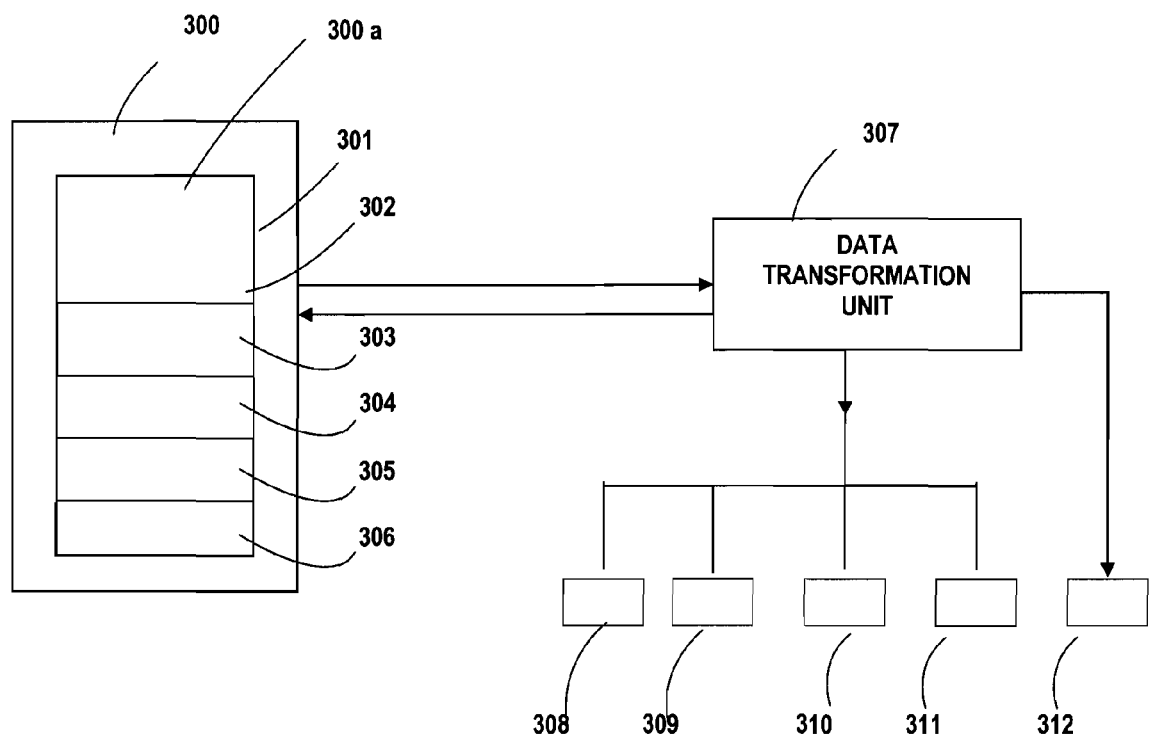
FIG. 3 is an illustration of components involved in a data transformation process of a method of dispatching a non-digital merchandise and/or allied services related code via a device operable on a mobile communication network, in accordance with an embodiment.

The mode of generating of the analytical report is explained further in conjunction with FIG. 3.

Further, the data transformation unit can be utilized to perform real-time monitoring and mechanism for the control of the stocks of the non-digital merchandise and/or allied services allotted to the merchandise provider from the merchandise manufacturer, based on the feedback of the real-time monitoring of the merchandise provider.

FIG. 3 is an illustration of components involved in a data transformation process, in accordance with an embodiment.

With reference to FIG. 3, the components involved in the data transformation process includes storage medium exemplified as a centralized server 300 in an embodiment.

As explained in FIG. 1, in a preferred embodiment the centralized server is a single entity. As is apparent to a person skilled in the art, the centralized server can be multiple entities at a single location or multiple entities that operate as a network. The server may include a database 300 a in which the details pertaining to the merchandise providers are stored.

In order to enable the details to be stored in the database 300*a* merchandise providers are required to furnish identifying information. As is prevalent in the art, the details may include the name and location of the merchandise providers.

In a preferred embodiment, the details may include, merchandise manufacturer details 301, non-digital merchandise and/or allied services identifying data 302, price data 303 which is conveyed to the consumer, merchandise provider details 304, quantity details 305 of the merchandise available and location details 306 of the merchandise provider.

In one embodiment, the price data 303 may represent the optimal price of the non-digital merchandise and/or allied services.

In another embodiment, the price data 303 may also represent the price of the merchandise as representing the price subject to predefined market conditions.

In yet another preferred embodiment, the details may include a web site related data pertaining to the merchandise manufacturer, name of the merchandise manufacturer, physical address of the merchandise manufacturer, numbers indicating the communication terminals associated with the merchandise manufacturer As explained in conjunction with FIG. 2, on obtaining the consent of the consumer and obtaining the required details, the merchandise provider is contacted and the non-digital merchandise and/or allied services information is delivered to the consumer.

In addition to delivering the information pertaining to the non-digital merchandise, the consumer related data is also transmitted to data transformation unit 307. It may be understood that the data transformation unit 307 may reside within the server or exist as the stand-alone unit excluding the server.

If the consumer decides not to purchase the non-digital merchandise or not use the allied services, the data is still transmitted to the data transformation unit. As explained in FIG. 1, data transformation unit 307 is deployed so that the non-digital merchandise details can be utilized for generating an analytical report.

In an embodiment, the analytical report may be a market intelligence information report 308.

In an embodiment, the analytical report may be a campaign performance report 309.

In an embodiment, the analytical report may be a conversion tracking report 310.

In an embodiment, the analytical report may be a merchandise provider performance report 311.

In another embodiment, the data transformation unit 307 is deployed so that the non-digital merchandise and/or allied services details can be utilized for a real-time monitoring system and mechanism 312 for the control of the stocks of the non-digital merchandise allotted to the merchandise provider from the merchandise manufacturer. The real-time monitoring system and mechanism 312 for the control of the stocks of the non-digital merchandise and/or allied services allotted to the merchandise provider is a software algorithm, which displays the performance of the merchandise provider in accordance with the codes received from the consumer on the move. The display of the performance of the merchandise provider is performed on the control panel. As the software algorithm calculates the performance of each merchandise provider on a dynamic basis, the data is viewable on the control panel of the merchandise manufacturers.

In an embodiment, the data is viewable on the control panel of third party agents. In an embodiment, the third party agents may be researchers. In an embodiment, the data may be used to generate secondary reports from the primary reports containing the data pertaining to the non-digital merchandise and/or allied services.

In another embodiment, a small store representative or owner needs to send a Short Message Service (SMS) from his registered mobile number or inserting his unique ID and the order in required quantities under a special or a standard scheme, would be placed to the system, such an SMS may also invoke a Unstructured Supplementary Service Data (USSD) request where in any additional products that the marketer wants to promote to the store would appear over the USSD session, and the Store representative can enter the quantities that he/she wants and submit, this will append his/her order or place a new order in addition to the order placed by Short Message Service (SMS).

The Store Representative will get a reply message indicating the Order ID, Order Value, and other information about schemes, products, delivery schedule, The Store Representative will also have option of Modifying or Canceling the Order Placed before the cut-off limit as specified by the client Marketer/Distributor.

The System will generate Region wise Demand report and Delivery Route wise report thus reducing the cost of operation and making distribution efficient for the client/marketer/distributor who depend on the large retailer network.

Figure 4:
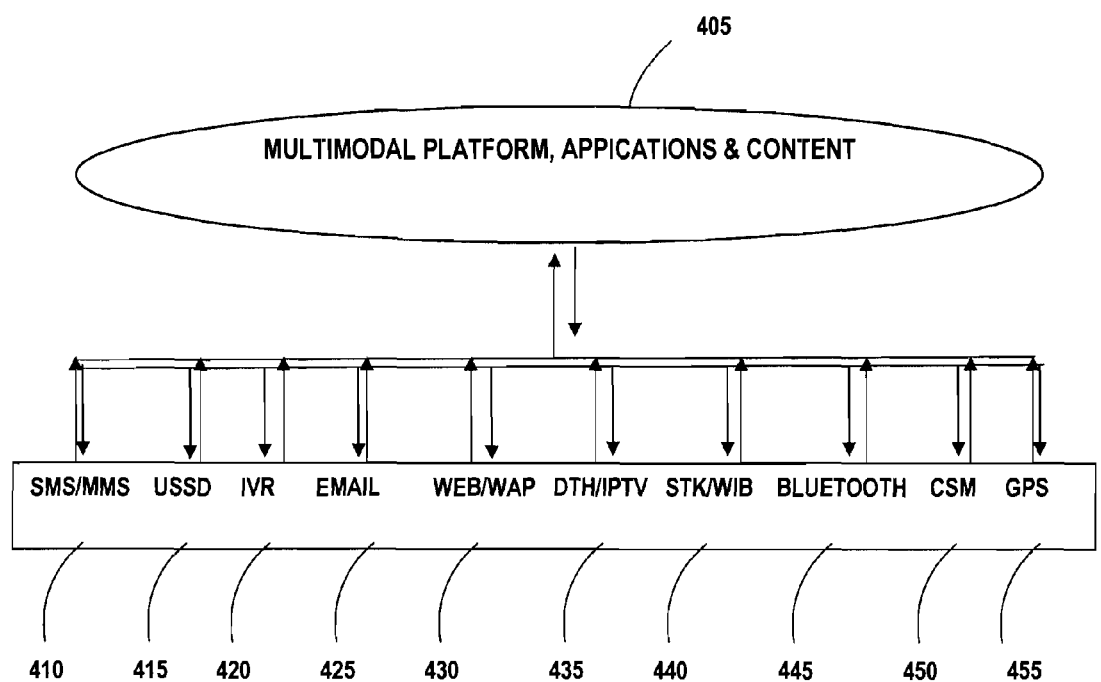
FIG. 4 is an illustration of a media, which may be deployed in a method of dispatching non-digital merchandise, and/or allied services related code via a device operable on a mobile communication network.

In this scenario, FIG. 4 is an illustration of the media, which may be deployed in the method of dispatching non- The services of Telecommunication and Mobile Operators/Mobile Value Added Service Providers, is utilized in relation to short-code/trailing short-code/short-code suffix, telephone number/mobile number/Short Message Service Center (SMSC), SMS Gateway Services, Bulk SMS Channels/Voice Portals/Interactive Voice Recognition Systems/Caller Line Identification, etc.

The SMS tools are placed/released along with the Advertisements made by advertisers/advertising agencies/providers of mass communication media.

In an embodiment, the format/syntax of the short message service (SMS) included with the advertised product is broadly defined as:

```
SMS <KEYWORD> <LOCATION> TO <NUMBER>
OR SMS <LOCATION> <KEYWORD> TO <NUMBER>
OR ANY COMBINATION OF LOCATION AND KEYWORD TO
<NUMBER>
SUCH AS <KEYWORD> <LOCATION> <KEYWORD> TO <NUMBER>
``` digital merchandise and/or allied services related code via a device operable on a mobile communication network.

FIG. 4 depicts the manner of Commercial Operation of the business process as deployed on a device operable on a mobile communication network. The figure illustrates the manner in which multi-modal message interaction is enabled through multi model platform 405 with the consumer over a device operable over a mobile communication network.

The figure illustrates the media which may be deployed in the method of dispatching non-digital merchandise and/or allied services related code via a device operable on a mobile communication network which are enlisted below:

(A) Via Text through Short Message Service (SMS)/MMS 410
(B) Via Voice through Interactive Voice Recognition Service (IVR) 420
(C) Via Direct-To-Home (DTH)/Internet Protocol Television (IPTV) 435
(D) Via Call to a dedicated Calling Number/Interactive Voice Recognition Service (IVR) 420
(E) Via Unstructured Supplementary Service Data (USSD) 415
(F) Via Bluetooth (Push) 445
(G) Via CSM Cell Sector Method (Cell site triangulation) 450
(H) Via Global positioning system (GPS) or Assisted GPS (AGPS) 455
(I) Via E-Mail 425
(J) Via WEB/WAP 430
(K) Via STIK/WIB 440

The manner of Commercial Operation of the Business Process is explained in detail in conjunction with FIG. 4. via text through Short Message Service (SMS) 410

An agreement is entered with Advertisers [Original Equipment Manufacturers (OEMs), Brand Owners, Marketing Companies, Individuals in the business of Fast Moving Consumer Goods (FMCG), Mutual Funds, Insurance, equipments, appliances and any enterprise having geographically distributed trade network, business partners, dealers, agents, franchisees and those using mass communication media for promotion and awareness/Advertising Agencies/providers of mass communication media in place.

An agreement is entered with various Dealers/Distributors/Channel Partners/Franchisee dealing with goods/services in relation to the advertisers' service.

It will be understood by a person skilled in the art that, the format illustrated above is an example, enclosed merely for the purposes of illustration and the formats capable of being deployed is not limited to the format enclosed above. In further extended embodiments, the consumer can use SMS to add more items:
<Order ID><add><P4*Q4><P5*Q5> to <NUMBER>

This will add in the given order two more products with specified quantities.

In still further embodiments, consumer can use SMS to cancel the order by sending this will cancel a particular order:
<Order ID><cancel> to <NUMBER>

This will cancel a particular order.

The above examples are for illustration only, they can also be received/send by the end-user in any other language as per the customized requirement of advertiser/customer. The Messages syntax is for examples only and may be changed dynamically, as per the requirements of the clients.

The system and method are also deployable via Unstructured Supplementary Service Data (USSD) 415, Voice through Interactive Voice Recognition Service (IVR) 420, Call to a dedicated Calling Number/Interactive Voice Recognition Service (IVR) 420, E-Mail 425, WEB/WAP 430, Direct-To-Home (DTH)/Internet Protocol Television (IPTV) 435, STK/WIB 440, Bluetooth (Push) 445, CSM Cell Sector Method (Cell site triangulation) 450 and Global Positioning system (GPS) or Assisted GPS (AGPS) 455.

Figure 5:
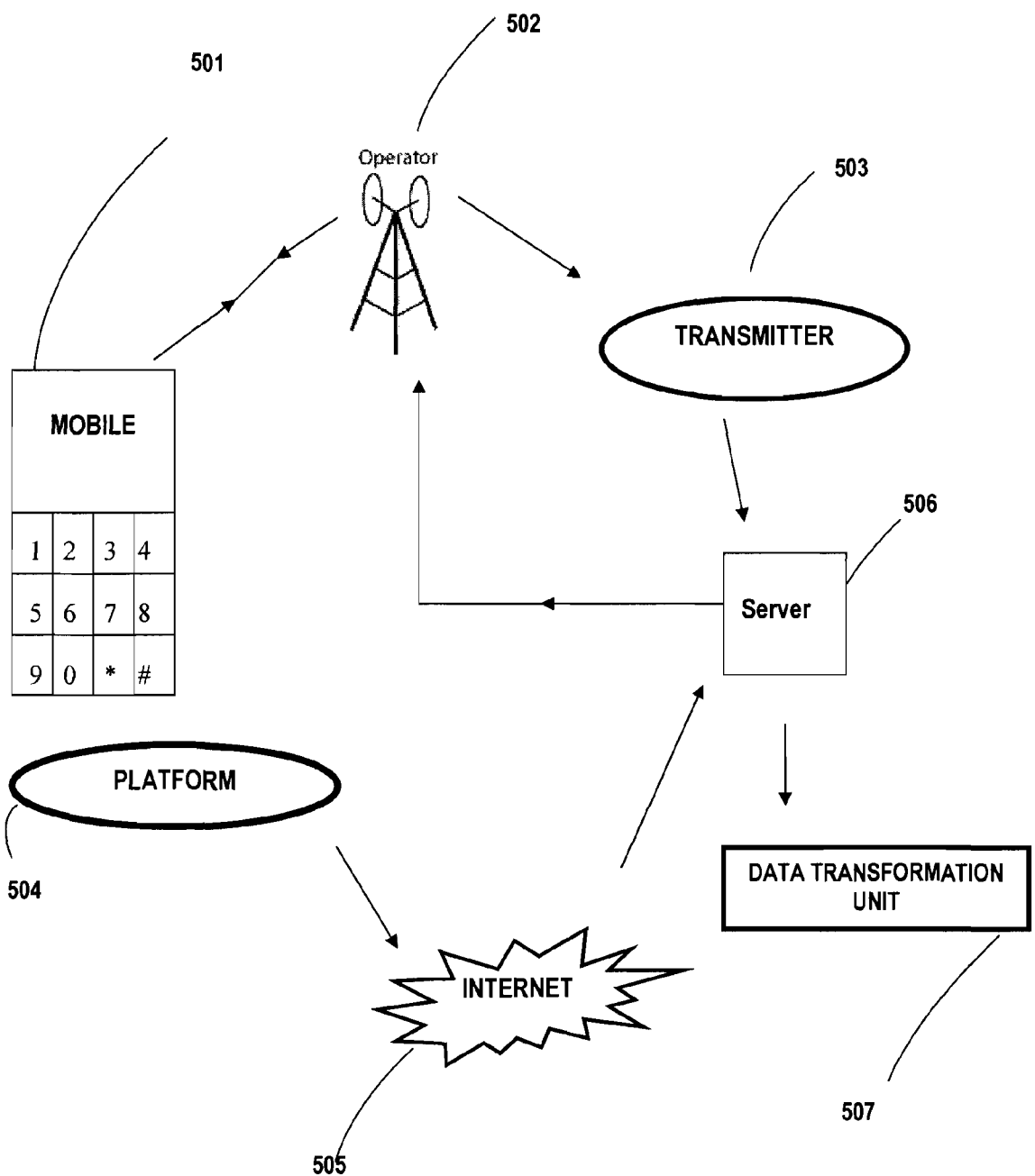
FIG. 5 is an illustration of the components of the system for dispatching non-digital merchandise and/or allied services related code via a device operable on a mobile communication network as embodied in one of the media depicted in FIG. 4.

FIG. 5 is an illustration of the components of the system for dispatching a non-digital merchandise and/or allied services related code via a device operable on a mobile communication network as embodied in one of the media depicted in FIG. 4.

With reference to FIG. 5, the system of dispatching non-digital merchandise and/or allied services related code via a mobile communication network is operated in conjunction with a user input device, which is, in a preferred embodiment, a mobile terminal. In FIG. 5, it is herein disclosed as a cell phone 501.

The system and method can further be mounted on any type of interactive networks such as SMS, IVR, WEB, WAP, DTH and the like. This enables ubiquitous response across networks from a customer who is present in a remote place.

The system has a user friendly and intuitive Semantic Web Interface (Web-Desktop Feature), while a backend uses convergence technologies to integrate with SMS, IVR, DTH, USSD Interface. It embraces Web 3.0 with semantic search algorithm that learns as it goes, constantly updating its results to suit the user at the time they are searching with contextual awareness as well.

The system and method are particularly suited for a scenario in which the user is on a move and is in possession of a mobile terminal operable on a mobile communication network. The user is required to input a code in the cell phone 501.

The data input by the user is fed to a mobile communication network operator 502.

The mobile communication network operator 502 transmits the input of the user to a user input transmitter 503. In an embodiment, the mobile communication network operator 502 may be in the form of a single entity with the user input transmitter 503.

The output of the user input transmitter 503 is input to a centralized server 506. In a preferred embodiment, the centralized server 506 is a single entity. As is apparent to a person skilled in the art, the centralized server 506 can be multiple entities at a single location or multiple entities that operate as a network. The server 506 comprises a database in which the details pertaining to the merchandise providers are stored.

After processing the message the server(s), sends the relevant information back to the user using means such as Short Message Service Center (SMSC)/SMS Gateways/Bulk SMS Channels, or through the channel from where the message was received. The message reaches the mobile or telephone operator who transmits the message to the server.

One or more entities can also be notified of this occurrence through SMS, IVR, Email, Web, WAP or any kind of communication media. These people may include, but are not limited to, suppliers of the product, services, agents and advertisers. Such people will get information about a prospective customer, product, price of the product, medium, offer, communication code, manufacturer details, date and time of occurrence, reference number for the occurrence, or any other information related to the occurrence.

In order to enable the details of the non-digital merchandise providers forming part of a platform 504 to be stored in the database, the non-digital merchandise providers are required to provide identifying information pertaining to their commercial transactions. As is prevalent in the art, the details may include the name and location of the non-digital merchandise providers. The non-digital merchandise providers are registered in the server 506 via a communication network 505. In a preferred embodiment, the communication network 505 is inclusive of the Internet. Even though the communication network 505 includes the Internet in the preferred embodiment, it is apparent to a person skilled in the art that any network with similar functionality can be utilized and the usage of any such network would be within the scope and spirit of the disclosed system and method.

The code sent by the consumer on the move, is stored in the server 506 and correlated with data stored beforehand. The correlation may be performed by a software algorithm or by any means known in the art for a similar functionality. The output of the correlation is fed to the cell phone 501 through the mobile communication network operator 502.

Concurrently, the output of the correlation is stored in a data transformation unit 507. It would be apparent to a person skilled in the art that the data transformation unit 507 could be a unit residing within the server 506. Alternatively, the data transformation unit 507 may also be separate from the server 506 and exist as a stand-alone entity. The data transformation unit 507 is deployed so that, the correlation output can be utilized for generating an analytical report.

The data transformation unit 507 can further be utilized for real-time monitoring and providing a mechanism for the control of the stocks of the non-digital merchandise allotted to the merchandise provider by the merchandise manufacturer, based on the feedback of the real-time monitoring of the merchandise provider.

The analytical report can be inclusive of a campaign performance report, campaign effectiveness report, conversion tracking report, dealer performance report, geographical location performance report, network performance report, media performance report and advertisement performance report.

FIG. 5A is a flow chart of a method for dispatching a non-digital merchandise and/or allied services related code via a device operable on a mobile communication network, as embodied in one of the media depicted in FIG. 4.

With respect to FIG. 5A, at Step 515a, a customer sends a promotional message provided in advertisements released on any promotional media type like Print media, Television, Radio, and Internet.

At step 520a, the sent promotional message reaches an operator, then to a service provider and ultimately to a server and after a series of queries, the server sends a relevant information back to the service provider and then reaches the operator.

Subsequent to step 525a, the Operator sends the relevant information as SMS to the Customer Mobile and customer receives the SMS.

At step 530a, the relevant product information is displayed on the customer's cell phone.

Figure 6:
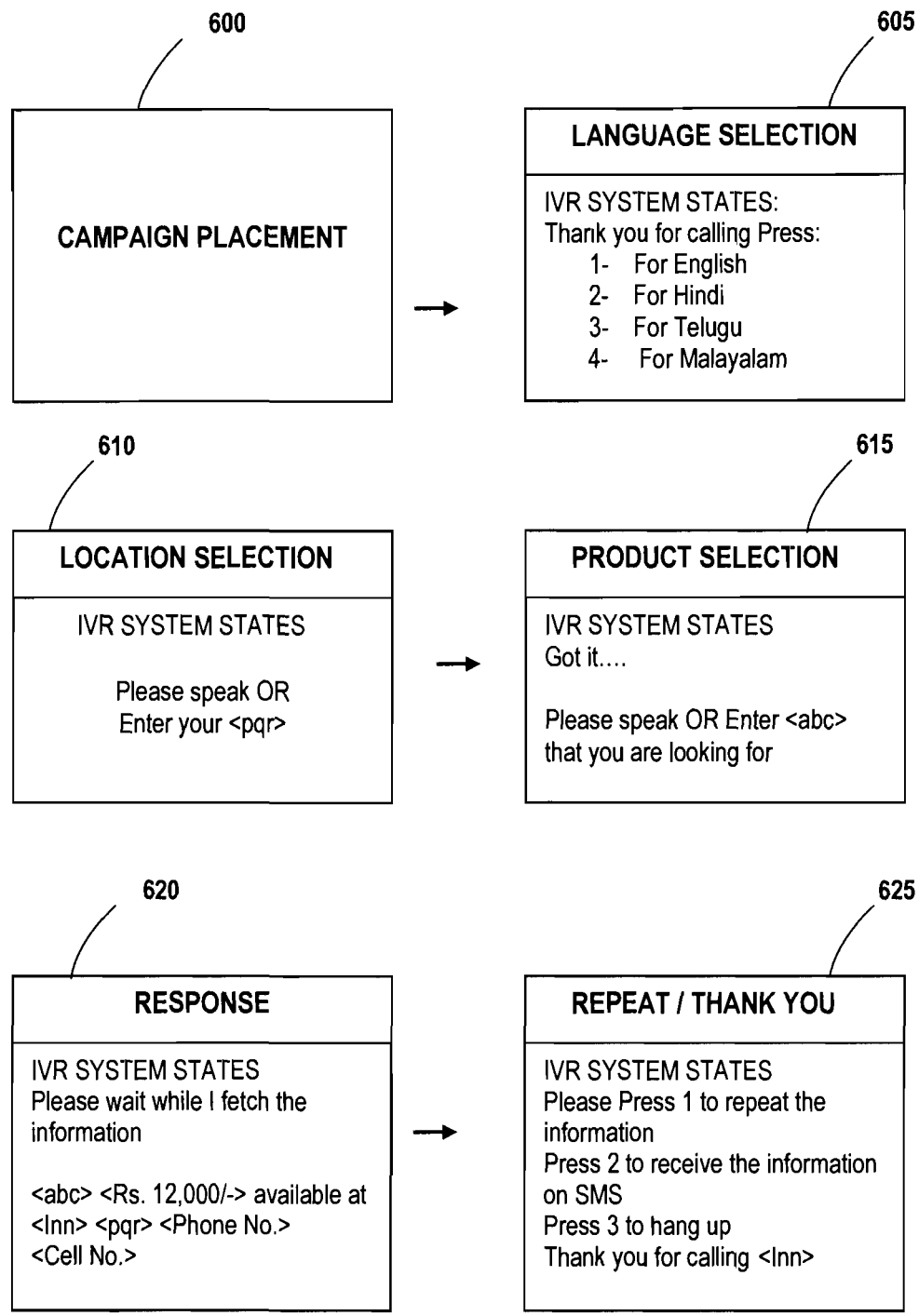
FIG. 6 illustrates the flow of drawings illustrating the steps in the method for dispatching non-digital merchandise and/or allied services related code via a device operable on a mobile communication network, as embodied in one of the media depicted in FIG. 4.

FIG. 6 illustrates flow of drawings illustrating stages in a method for dispatching a non-digital merchandise and/or allied services related code via a device operable on a mobile communication network, as embodied in one of the media depicted in FIG. 4.

Initially, an agreement is entered with Advertisers [Original Equipment Manufacturers (OEMs), Brand Owners, Marketing Companies, Individuals in the business of Fast Moving Consumer Goods (FMCG), Mutual Funds, Insurance, equipments, appliances and any enterprise having geographically distributed trade network, business partners, dealers, agents, franchisees and those using mass communication media for promotion and awareness/Advertising Agencies/providers of mass communication media.

An Agreement is also established with various Dealers/Distributors/Channel Partners/Franchisee dealing with goods/services in relation to the advertisers' service.

The services of Telecommunication and Mobile Operators/Mobile Value Added Service Providers, in relation to short-code/trailing short-code/short-code suffix, telephone number/mobile number/Short Message Service Center (SMSC), SMS Gateway Services, Bulk SMS Channels/Voice Portals/Interactive Speech Recognition Systems/Caller Line Identification/VoIP—Voice over Internet Providers etc. are utilized.

The overall syntax for using the IVRS system is as follows: Call <IVRS CODE>.

Example

For more information (localized price/offer and/or availability) of the advertised product call <xyz>. Wherein the caller's origin is known dynamically from the STD Code (Subscriber Trunk Dialing Code) or the Telecom/Mobile Circle/Cell Site from where the senders mobile/telephone number belongs/Call Origin Cell Site/IP and requirement is dynamically tracked from the dedicated <xyz> number which is related to a single <pqr>.

At stage 600, Customer views the promotional message on advertisement.

Subsequent to the customer viewing of the promotional message on the advertisement, IVR system uses speech recognition or dial pad or both and instructs customer to select the language option, at stage 605.

At stage 610, IVR system uses speech recognition or dial pad or both and instructs customer to select the location option.

Subsequently, at stage 615, IVR system uses speech recognition or dial pad or both and instructs customer to select the product.

At stage 620, based on customer's response to the given instruction, the relevant product information being provided by the IVR System.

At stage 625, IVR system transaction instructs the customer to repeat the prior information or to end the transaction. A notification is also performed to the seller.

FIG. 6A is a flowchart of the method for dispatching a non-digital merchandise and/or allied services related code via a device operable on a mobile communication network, as embodied in one of the media depicted in FIG. 4. 3

In the age of rapid-response marketing, the emphasis is on speed of decision-making. The Interactive response system is the obvious choice of the marketers that results in shortening the time duration of the sales oriented creative advertisement cycle. The consumer is very particular that the information pertaining to non-digital merchandise be available to him on the move. In one of the embodiments the mode of access is via the Interactive Voice Response System (IVRS).

In such a scenario, the customer accesses the Interactive Voice Response System (IVR) through the information provided in the promotional message at step 600a.

At step 605a, the IVR system uses speech recognition or dial pad or both and instructs customer to select the language option.

At step 610a, IVR system uses speech recognition or dial pad or both and instructs customer to select the location option.

At step 615a, IVR system uses speech recognition or dial pad or both and instructs customer to select the product.

At step 620a, based on customer's response to the given instruction, the relevant product information being provided by the IVR System.

At step 625a, IVR system transaction instructs the customer to repeat the prior information or to end the transaction.

At step 630a, the transaction ends and simultaneous message is sent to the seller.

Figure 7:
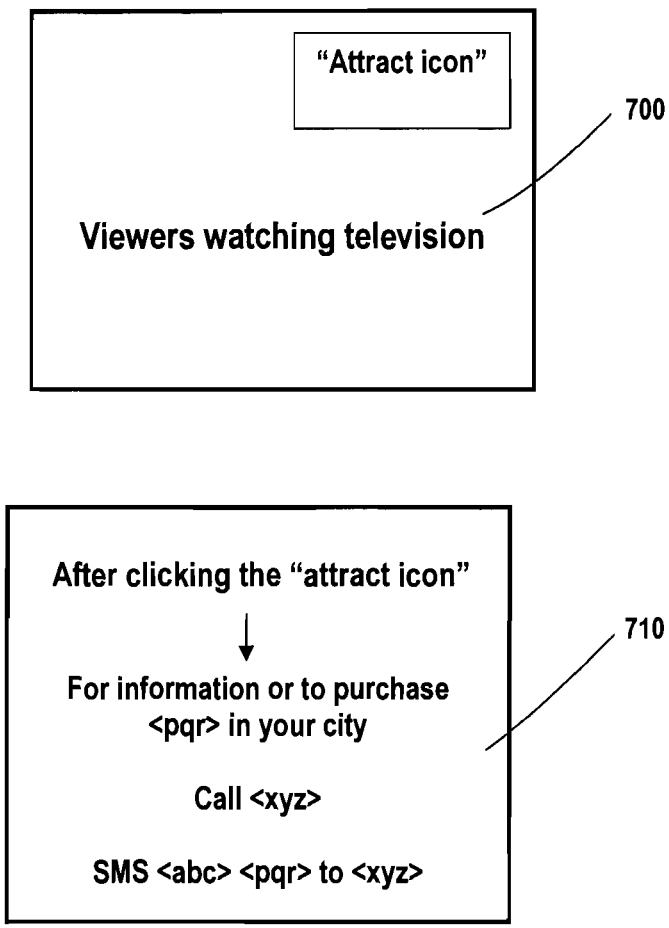
FIG. 7 illustrates the flow of drawings depicting the steps in the method for dispatching non-digital merchandise and/or allied services related code via a device operable on a mobile communication network, as embodied in one of the media, depicted in FIG. 4.

FIG. 7 illustrates the flow of drawings depicting the steps in a method for dispatching non-digital a merchandise and/or allied services related code via a device operable on a mobile communication network, as embodied in one of the media, depicted in FIG. 4.

In the age of rapid-response marketing, the emphasis is on shortening the time duration of the sales oriented creative advertisement cycle and that the information pertaining to non-digital merchandise be available to consumer on the move. In one of the embodiments, the mode of access is via the Direct To Home (DTH) or Internet Protocol Television (IPTV).

Initially, agreements are put in place with the Direct-to-Home (DTH)/Internet Protocol Television (IPTV) service providers, network of dealers dealing with goods/services. In the DTH/IPTV mechanism, only the consumer utilizing the services of DTH/IPTV will be able to see an attract icon on the Television or mobile television screen yielding information to the end-user about an advertisement which is interactive.

Even though the method for dispatching a non-digital merchandise and/or allied services related code via a device operable on a mobile communication network, as embodied in one of the media, depicted in FIG. 4, it would be apparent to a person skilled in the art, that the attract icon is merely a mechanism of implementing the system and method, and any other functional equivalent would be considered to be within the spirit of the disclosed system and method.

Through the DTH mechanism, an attract icon is beamed on the Television or mobile television, 1) While a viewer is watching Television 700 or mobile television an icon termed the "attract icon" appears on the screen. The "attract icon" indicates that there is an "interactive" component pertaining to the program or advertisement.

2) The end-user who clicks the "attract icon" 710 will be able to obtain the interactive advertisement whose time frame will increase and the live Television feed will go in Picture-In-Picture (PIP) or nm in background.

For example:

Are you interested to buy the latest Nokia N91 mobile? Press "attract button"

3) The end-user uses the interactive remote provided by the DTH/IPTV service provider to make his necessary selection.

4) The interactive service provider sends the message containing the product code, quantity and location of the customer to the server, which interacts with a network of distributors and gets the information about where the product is available in a certain pin code/location and at what price and offer.

5) Interested people can also be notified of this occurrence through SMS, email, Web, WAP or any kind of communication media. They can also be connected directly to the IVR call. Interested people may include suppliers of the product, services, agents and advertisers. Such people will get information about the prospective customer, product, price of the product, medium, offer, communication code, manufacturer details, date and time of occurrence, reference number for the occurrence, or any other information related to the occurrence.

FIG. 7A is an illustration of the flowchart of the method for dispatching non-digital merchandise and/or allied services related code via a device operable on a mobile communication network, as embodied in one of the media depicted in FIG. 4.

At step 700a, while a viewer is watching Television or mobile television an icon termed the "attract icon" appears on the screen. The "attract icon" indicates that there is an "interactive" component pertaining to the program or advertisement.

At step 710a, the viewer clicks the icon via remote provided by DTH/IPTV service provider, the service provider sends the message to server, which then interacts with network distributor and provides the details of the product and its available location immediately.

Figure 8:
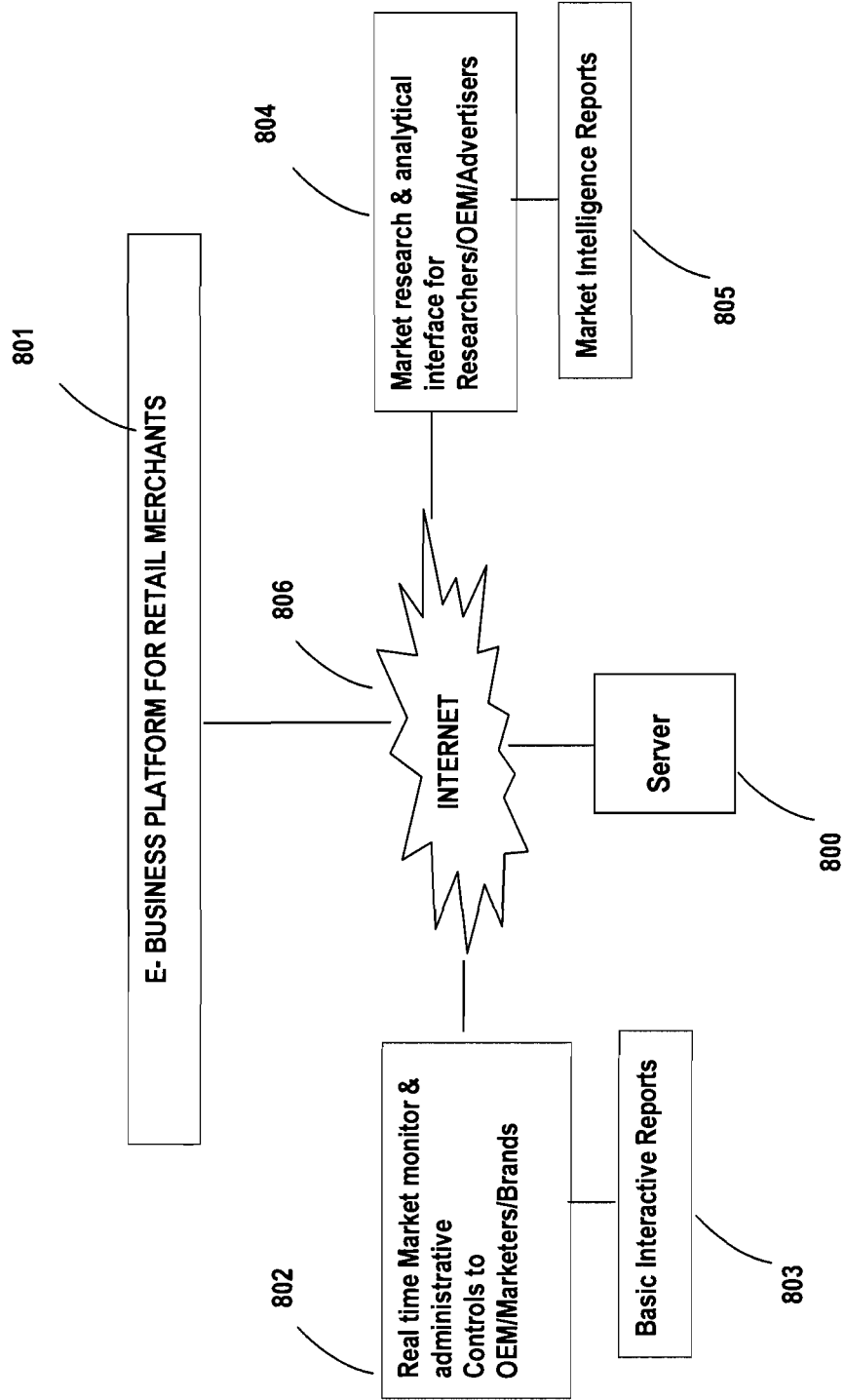
FIG. 8 is an illustration of the report generation by the method for dispatching non-digital merchandise and/or allied services related code via a device operable on a mobile communication network, as embodied in one of the media depicted in FIG. 4.

FIG. 8 is an illustration of the report generation by a method for dispatching a non-digital merchandise and/or allied services related code via a device operable on a mobile communication network.

In a preferred embodiment the centralized server 800 is a single entity. The server 800 is connected to a platform associated with merchant details 801 via communication network 806. In an embodiment the communication network is Internet. As is apparent to a person skilled in the art, the server can be multiple entities at a single location or multiple entities that operate as a network. The server may include a database in which the details pertaining to the merchandise providers are stored.

In one embodiment, the price data may represent the optimal price of the non-digital merchandise and/or allied services.

In yet another preferred embodiment, the details may include web site related data pertaining to the merchandise manufacturer, name of the merchandise manufacturer, physical address of the merchandise manufacturer, numbers indicating the communication terminals associated with the merchandise manufacturer.

In an embodiment, one of the two types of reports are generated:
(1) Basic Interactive Reports 803
(2) Market Intelligence Reports 805

Basic Interactive reports are generated from a real time market monitor 802. The market Intelligence report are generate from market research and analytic interface 804.

In another embodiment, both the reports may be generated. In yet another embodiment, the reports may be used in combination or in the isolation. Both the forms and application in isolation or in combination are within the scope and spirit of the system and method described herein.

In the scenario of the Basic Interactive Reports:
1) The network of dealers/agents/frontline sales/staff who gets the inquiries from different pin-code/locations are found and evaluated through the server.
2) The inquiry received by the server also finds out how many enquiries are carried till end by completing the successful transaction.

Based on various information collected during the process of lead generation to closure and re order, the various reports are generated providing market intelligence and customer insights.

In the scenario of the Market Intelligence Reports:
1) The efficiency rating of advertisements, advertisement creative, offer, etc. are done through various market intelligence reports and accordingly inputs can be given to Brand Managers/Creative Directors/Media Planners/Media Buyers/Marketing Department in charge of branding and advertising of various products/services.
2) Market Inputs can be given through the market intelligence reports on the basis of the inquiries received & updated from different pin-code/locations knowing where a particular product is in much demand, which in turn would help better advertising and promotion of the products/services.

An embodiment also provides an advertisement management service. The service is offered for both Web based as well as SMS based applications.

The facility permits revenue sharing through advertisements. Further the advertisements placed are carefully selected by region, product classification and price range. It also does not allow advertisements of clients offering competitive services to be placed in the storefront or sms.

It is apparent to a person skilled in the art, the storage medium exemplified as a centralized server can be multiple entities at a single location or multiple entities that operate as a network. The server comprises a database in which the details pertaining to the merchandise providers may be stored.

Advantages:

The described system and method have diverse advantages whose representative embodiments are revealed herein. The enlisted advantages are merely illustrative and those of similar functionality and arising as a secondary derivative of the advantages revealed herein. The combinations and variations thereof are also considered to be within the spirit and scope of the claimed invention.

By combining the benefits of customer engagement with media management the described system and method helps in improving marketing performance.

The system and method provide an effective tool to track and manage leads efficiently to improve sales and thus achieve revenue goals.

The system and method are a powerful tool for monitoring financial performance of marketing spends. It is a tracking system for online and offline media. The system and method deliver geo-consumer centric data over multimode platforms such as Mobile Short Messaging Service (SMS), Interactive Voice Response (IVR), Direct To Home (DTH), Unstructured Supplementary Service Data (USSD) and the like for effective lead management to the efficient most front-liner in the neighborhood of the prospect.

The system and method has interactive tools to enable large brands that depend on multiple advertisement channels and distribution networks to accurately measure the response as well as provide real time response to consumer requests for goods and services, thereby improving both short and long term efficiency of such promotional advertisements.

The system and method is a solution to advertisers for measuring the ROI of all media types on a single platform, which makes performance of conventional advertisements comparable to performance of online advertisements in real time. And while doing so provides very effective lead distribution system to shorten the sales cycle time using their current sales network.

The system and method seamlessly integrate the sales and the marketing divisions. The leads that originate from media expenditure, now appear on the mobile phones of the agents/front-lines in real-time, that not only leads to quick response to the customer but also this sense of fulfillment brings the motivation to the front-liner and makes the customer loyal.

The system and method acts as a handy tool to the sales managers, to check the performance of their subordinates/front-liners and the agents. Managers exercise the full control as to whom the sales leads needs to be distributed in the designated geography. Further they have access to various collaborative tools like One Click Bulk Short Message Services (SMS) with personalized message, which improves communication efficiency of the large sales teams.

The unique lead distribution system, assigns leads to the trade network based not only on their geographic distance, but also their Efficiency (EFF) Score. That means the leads are assigned only to those agents/front-lines who are efficient in terms of number of leads updated as well as closed, such an Efficiency (EFF) Score is multiplied with the geo-spatial distance while identifying the recipient/s for the lead.

The self-learning algorithm creates active competition among the potential recipients, as only the efficient ones get more leads, this competition among agents/frontlines creates the efficiency and higher performance of the sales territory, and such efficiency catapults the entire sales department.

The system and method are geared to increase collaboration and efficiency of the entire Sales department and while doing so it also removes the disconnection between the Sales and the Marketing departments.

The system and method offers increased productivity and business growth through intelligent performance management, integrated data and campaign management. The system and method enables identifying the advertising channel yielding maximum returns. The impact of each advertisement on sales is measurable in an accurate manner.

The system and method enable calculating the cost per lead and measuring performance of sales team in an accurate manner. It also provides collaborative tools to improve communication within the team.

The system and method enables Integrating analysis from lead to conversion and tracks the programs providing value to customers. Further the system and method enable targeting specific customer segments through campaigns.

The system and method enables identifying frequency of re-stocking of product by distributor to maintain optimum inventory. Further the system and method enables providing detailed monitoring across the supply chain. It also benchmarks distributors and locations to reward high performers.

The system and method enables analyzing customer purchase information to be used in product development. Further the system and method provides information on customer usage of the product.

The system and method enables comparative model performance and Comparative artwork performance. Further the system and method provides the efficient testing of marketing messages.

The system and method enables providing accountability to the marketing budget and enables targeted cost cutting. Further the system and method increases accuracy in budgeting & forecasting.

The system and method enables acquiring relevant and valid leads effortlessly and facilitates increase in customers handled. Further it reduces the sales cycle.

The system and method enable obtaining accurate real time information on product/dealer. Further the system and method promote interaction with Advertisement brand over Short Message Services (SMS), Interactive Voice Response (IVR), Wireless Application Protocol (WAP) and the like.

The system and method enable reducing cost of recruiting, follow-up and tracking of recruitment across regions. Further the system and method minimizes response time and time taken for completion of recruitment process.

The system and method enables managing campaigns intelligently by providing flexible options of selecting media. It further provides non-intrusive automatic validation or qualification of leads. In an embodiment the automatic validation or qualification of leads is performed via an SMS questionnaire. In other embodiments the automatic validation or qualification of leads is performed via known modes.

The system and method enable promoting designing of customized campaigns for the area and captures response to individual campaigns on real time basis.

The system and method enable prompt inquiry response and augmented customer satisfaction. It results in enhanced brand equity.

The system and method enables an SMS based feedback system, which comes as a powerful add-on tool to the online system of the lead feedback functionality. It provides the agents with the facility to update lead status through SMS and also prompts reminders to them to contact and update leads.

The system and method can be integrated with mobile payment gateways to enable speedy lead closure and faster payment collection. It further promotes geo-targeted advertisements and real time response to prospects. It increases front-liner productivity and customer engagement and shortens the advertisement and sales cycle.

The system and method enable making conventional media more interactive indicating which medium/mode of communication attracts more customers. It further facilitates comparison across media, for media/marketing managers. It still further indicates the media bringing in more leads.

The system and method enable creating a healthy competition among the lead recipients as the most efficient agent gets the maximum leads. Further it assists the sales manager to control distribution of leads and monitor performance of the sales staff. It still further promotes optimum performance of the sales department by increasing the individual efficiency and ensures smooth coordination of sales and marketing departments.

The system and method enable the efficient tracking of the sales team and also indicates the status of tasks assigned to each member of the team. Its use can be further extended to maintain interoffice connectivity between any team or teams with interrelated tasks.

The system and method provides marketing solution across all types of businesses.

With respect to Banks, Mutual Funds, Insurance firms and the like, the system and method combines demographic data and customer purchasing data to optimize the product mix advertised, improves customer satisfaction, discover cross sell opportunities and devise targeted campaigns thus improving top-line growth.

The companies in the entertainment segment like film production houses, theatres, events etc. can gain insight into customer interest. It facilitates geo-targeted campaigning, provides instant customer reach, converts customer reactions to numbers and thus helps predict box office performance from pre-release movie data.

With respect to the manufacturers and retailers, the system and method enables integrating data of customer information thus helping the sales and other teams to coordinate customer interactions. It also enables tracking of sales trends and delivering customer service analytics across to organization to measure customer satisfaction. It therefore eliminates delay in responding to the customer and promotes the customer acquisition.

The described system and method is embodied as a complete end-to-end solution, which enables commitment to customers by employing innovative technology, and still however user friendly.

The invention claimed is:

1. A method of dispatching a non-digital merchandise and/or allied services related code, via a device operable on a mobile communication network, the method comprising:
 a mobile communication network operator accepting a code sent from a user via a mobile terminal of the device operable on the mobile communication network, the code being indicative of non-digital merchandise and/or allied services on a promotional medium, said promotional medium being viewable by a user;
 the centralized server storing the code in a database of the centralized server;
 analyzing the code for determining consumer requirements, so as to extract requisite information from the database;
 extracting information from the database according to the analyzed code;
 the mobile communication network operator communicating the extracted information to the mobile terminal of the device over the mobile communication network; and
 a data transformation unit performing a transformation of the extracted information for generating an analytical report simultaneously with the step of communicating the extracted information to the user;

wherein the device operable on a mobile communication network is selected from a wireless mobile telephone, a personal digital assistant, a personal communicator, or a paging device, and wherein the code includes an indicia that indicates details pertaining to a particular type of media in which the promotional medium is viewed.

2. The method as recited in claim 1, wherein the indicia also indicates details pertaining to at least one of: non-digital merchandise and/or allied services; merchandise range; merchandise category; merchandise class details; and details pertaining to geographical location.

3. The method as recited in claim 1, wherein the promotional medium is at least one of: a print media; a broadcast media; and a web media.

4. The method as recited in claim 3, wherein the print media is at least one of newspapers, magazines, journals, posters, billboards, and wall paintings.

5. The method as recited in claim 3, wherein the web media is the Internet.

6. The method as recited in claim 1, further comprising generating the analytical report based on the transformation of the extracted information.

7. The method as recited in claim 6, wherein the analytical report is a market intelligence report.

8. The method as recited in claim 6, wherein the analytical report is an interactive report.

9. The method as recited in claim 6, wherein the analytical report is a conversion tracking report.

10. The method as recited in claim 1, further comprising sending the extracted information from the data transformation unit to a real-time monitoring mechanism for controlling a stocks of a non-digital merchandise and/or allied services allotted to a merchandise provider from a merchandise manufacturer, calculating a performance of the merchandise provider, and displaying a performance of the merchandise provider in accordance with the codes received from the user.

11. The method as recited in claim 1, wherein the indicia indicates details pertaining to a newspaper as the particular type of media in which the promotional medium is viewed.

12. The method as recited in claim 1, wherein the indicia indicates details pertaining to a television channel as the particular type of media in which the promotional medium is viewed.

13. The method as recited in claim 1, wherein the code is an alphanumeric code.

14. The method as recited in claim 1, further comprising the mobile communication network operator transmitting the code to a user input transmitter.

15. The method as recited in claim 14, wherein the mobile communication network operator and the user input transmitter are both part of a single entity.

16. The method as recited in claim 1, wherein the centralized server is configured to store one or more of merchandise manufacturer details; non-digital merchandise and/or allied services identifying data; price data; merchandise provider details; quantity details of merchandise available; and location details of a merchandise provider.

17. The method as recited in claim 1, wherein the extracted information includes at least one of: an optimal price or price subject to pre-defined market conditions of the non-digital merchandise and/or allied services; a list of details pertaining to the merchandise and/or allied services; a non-digital merchandise range; a broader category of non-digital merchandise and/or allied services related information.

18. The method as recited in claim 1, further comprising the mobile communication network operator accepting the code sent from the user via the mobile terminal of the device via at least one of: an Interactive Voice Response (IVR) message; a website; a Wireless Application Protocol (WAP) message; a Direct-To-Home (DTH) message; an electronic mail (E-Mail) message; and an Unstructured Supplementary Service Data (USSD) message.

19. The method as recited in claim 1, wherein the mobile communication network operator communicating the extracted information to the mobile terminal of the device over the mobile communication network via at least one of: a Short Message Service (SMS) message; an Interactive Voice Response (IVR) message; a website; a Wireless Application Protocol (WAP) message; a Direct-To-Home (DTH) message; and an Unstructured Supplementary Service Data (USSD) message.

* * * * *